United States Patent
Nanjo

(10) Patent No.: US 12,296,834 B2
(45) Date of Patent: May 13, 2025

(54) ENERGY ESTIMATION APPARATUS

(71) Applicant: DENSO CORPORATION, Kariya (JP)

(72) Inventor: Hiroyuki Nanjo, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 18/198,871

(22) Filed: May 18, 2023

(65) Prior Publication Data

US 2023/0382404 A1 Nov. 30, 2023

(30) Foreign Application Priority Data

May 25, 2022 (JP) ................................. 2022-085406

(51) Int. Cl.
| | |
|---|---|
| *B60W 40/105* | (2012.01) |
| *B60W 40/08* | (2012.01) |
| *B60W 40/10* | (2012.01) |
| *B60W 40/13* | (2012.01) |

(52) U.S. Cl.
CPC .......... *B60W 40/105* (2013.01); *B60W 40/08* (2013.01); *B60W 40/1005* (2013.01); *B60W 40/13* (2013.01); *B60W 2530/16* (2013.01); *B60W 2555/20* (2020.02)

(58) Field of Classification Search
CPC ............... B60W 40/105; B60W 40/08; B60W 40/1005; B60W 40/13; B60W 2530/16; B60W 2555/20; B60W 40/10; B60W 2552/00; B60W 2552/20; B60W 2556/50; B60W 50/0097; B60W 40/00; B60W 2520/10; B60W 2520/105; B60W 2555/60; B60L 3/12; B60L 58/12; B60L 2240/14; B60L 2240/68; B60L 2260/52
See application file for complete search history.

(56) References Cited

U.S. PATENT DOCUMENTS

| | | |
|---|---|---|
| 2016/0245662 A1 | 8/2016 | Rajagopalan et al. |
| 2022/0291004 A1 | 9/2022 | Yokota et al. |

FOREIGN PATENT DOCUMENTS

JP 2019108014 A * 7/2019

* cited by examiner

*Primary Examiner* — Jacob M Amick
*Assistant Examiner* — Charles J Brauch
(74) *Attorney, Agent, or Firm* — Oliff PLC

(57) ABSTRACT

An energy estimation apparatus includes a probability setting unit, a vehicle speed pattern estimation unit, a traveling load estimation unit, and an energy estimation unit. The probability setting unit sets a vehicle speed probability that is a probability of a vehicle reaching a certain vehicle speed on a traveling route that is specified by traveling route information. The vehicle speed pattern estimation unit estimates a vehicle speed variation pattern of the vehicle on the traveling route based on the traveling route information and the vehicle speed probability. The traveling load estimation unit estimates traveling load characteristics of the vehicle on the traveling route. The energy estimation unit estimates energy required for traveling of the vehicle using the traveling load characteristics and the vehicle speed variation pattern.

18 Claims, 14 Drawing Sheets

FIG.6

| LOCATION | TRAVELING ROUTE INFORMATION ||||| TRAFFIC INFORMATION | PROBABILITY INFORMATION |
| --- | --- | --- | --- | --- | --- | --- | --- |
| | LATITUDE | LONGITUDE | ELEVATION | | CLASSIFICATION | LEGAL SPEED LIMIT | VEHICLE-STOPPING PROBABILITY |
| i=1 | LATITUDE(1) | LONGITUDE(1) | ELEVATION(1) | | TYPE 2 | 50km/h | 100 |
| i=2 | LATITUDE(2) | LONGITUDE(2) | ELEVATION(2) | | TYPE 2 | 50km/h | 10 |
| i=3 | LATITUDE(3) | LONGITUDE(3) | ELEVATION(3) | | TYPE 1 | 50km/h | 10 |
| i=4 | LATITUDE(4) | LONGITUDE(4) | ELEVATION(4) | | TYPE 3 | 50km/h | 100 |
| i=5 | LATITUDE(5) | LONGITUDE(5) | ELEVATION(5) | | TYPE 0 | 40km/h | 0 |
| i=6 | LATITUDE(6) | LONGITUDE(6) | ELEVATION(6) | | TYPE 1 | 40km/h | 80 |
| i=7 | LATITUDE(7) | LONGITUDE(7) | ELEVATION(7) | | TYPE 4 | 50km/h | 100 |
| i=8 | LATITUDE(8) | LONGITUDE(8) | ELEVATION(8) | | TYPE 2 | 50km/h | 20 |
| i=9 | LATITUDE(9) | LONGITUDE(9) | ELEVATION(9) | | TYPE 2 | 50km/h | 100 |

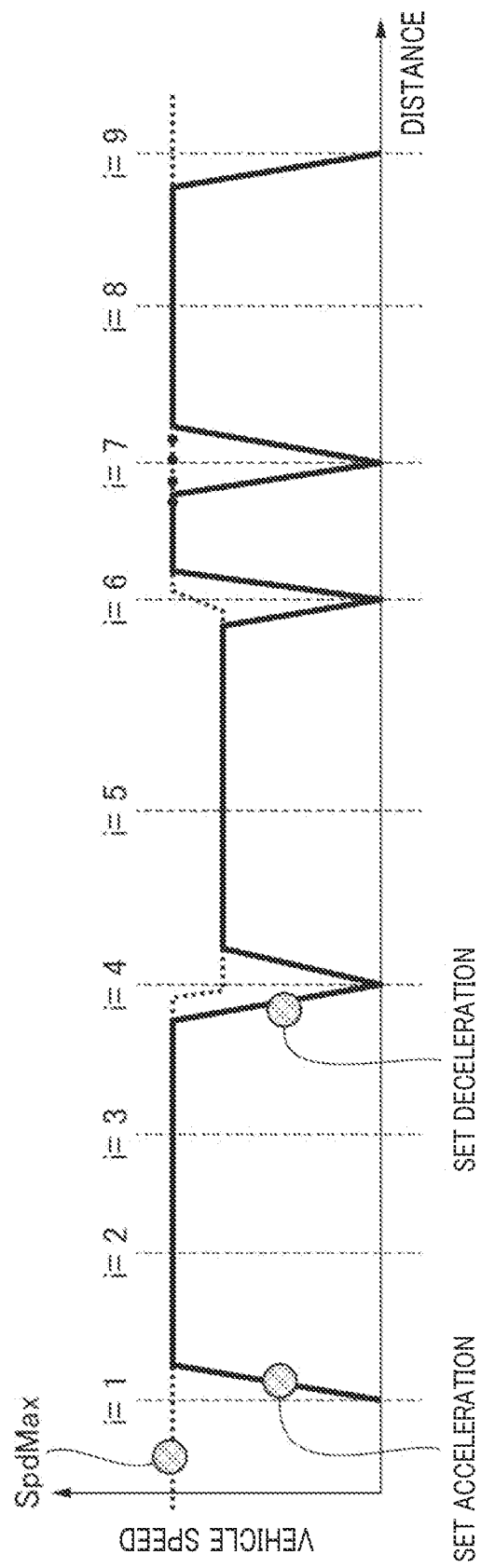

FIG.15
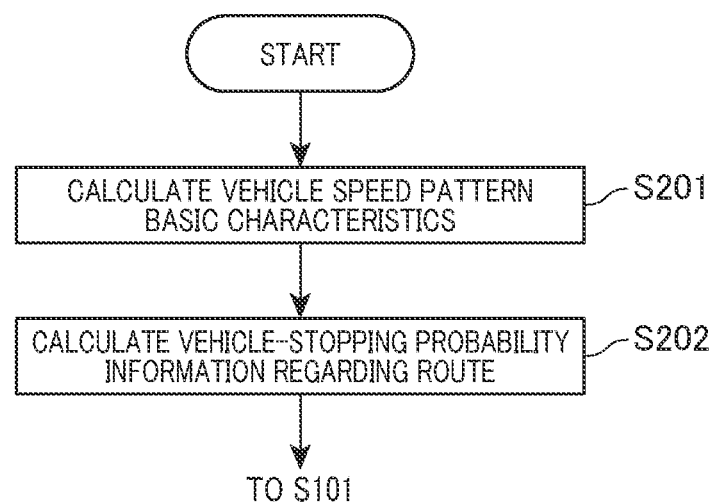
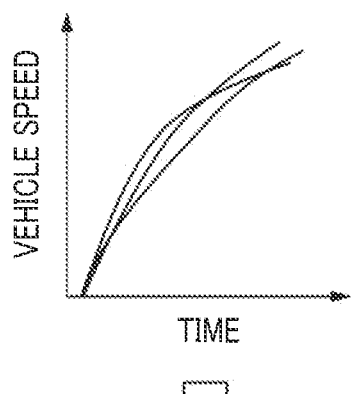
FIG.16A
AVERAGE ACCELERATION
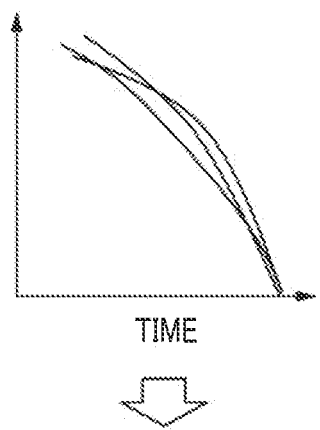
FIG.16B
AVERAGE DECELERATION
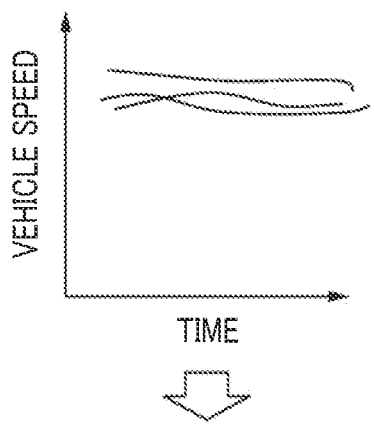
FIG.16C
AVERAGE STEADY-STATE VEHICLE SPEED

ENERGY ESTIMATION APPARATUS

CROSS-REFERENCE TO RELATED APPLICATIONS

This application is based on and claims the benefit of priority from Japanese Patent Application No. 2022-085406, filed on May 25, 2022. The entire disclosure of the above application is incorporated herein by reference.

BACKGROUND

Technical Field

The present disclosure relates to an energy estimation apparatus.

Related Art

Regardless of whether a vehicle is an electric automobile that uses a battery as an energy supply source or an automobile that has an internal combustion engine that uses fossil fuel as the energy supply source, a remaining cruising range of the vehicle is required to be ascertained for stable vehicle operation. As the related art, a method for estimating a cruising range of the vehicle is provided.

SUMMARY

One aspect of the present disclosure provides an energy estimation apparatus. The energy estimation apparatus sets a vehicle speed probability that is a probability of a vehicle reaching a certain vehicle speed on a traveling route that is specified by traveling route information. The energy estimation apparatus estimates a vehicle speed variation pattern of the vehicle on the traveling route based on the traveling route information and the vehicle speed probability. The energy estimation apparatus estimates traveling load characteristics of the vehicle on the traveling route. The energy estimation apparatus estimates energy required for traveling of the vehicle using the traveling load characteristics and the vehicle speed variation pattern.

BRIEF DESCRIPTION OF THE DRAWINGS

In the accompanying drawings:

FIG. 6 is a diagram illustrating an example of vehicle-stopping probability data;

FIG. 7 is a diagram illustrating an example of vehicle speed estimation data;

FIG. 15 is a flowchart for explaining an information processing flow using the energy estimation apparatus shown in FIG. 1, the information processing flow including a process for calculating a vehicle speed variation pattern from accumulated vehicle speed data;

FIG. 16A to FIG. 16C are diagrams illustrating an example of calculation of acceleration, deceleration, and vehicle speed;

DESCRIPTION OF THE EMBODIMENTS

Figure 1:
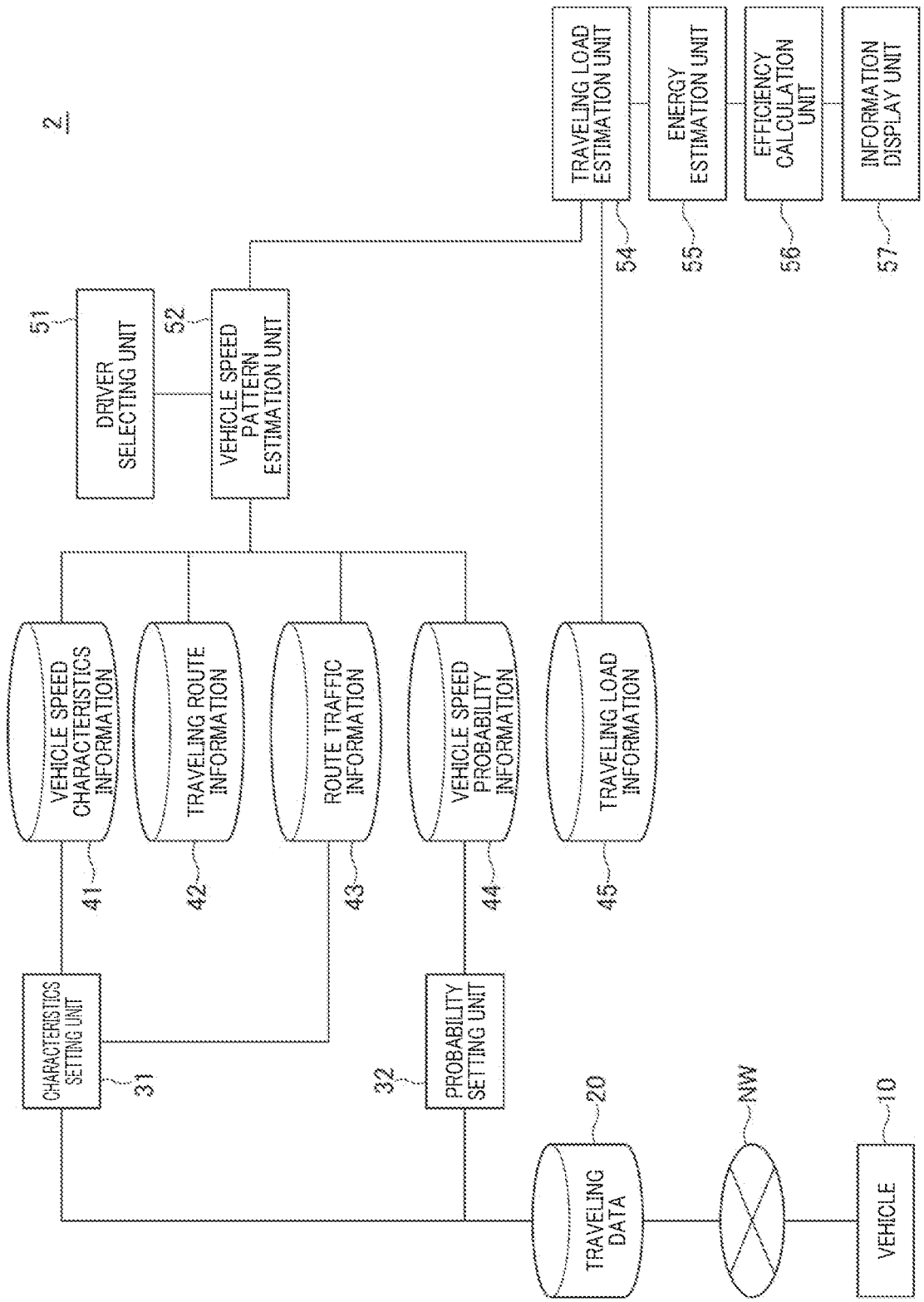
FIG. 1 is a block configuration diagram for explaining an energy estimation apparatus according to a present embodiment.

In JP 2019-108014 A, as a method for estimating a cruising range of a vehicle, a traveling pattern of the vehicle is estimated from route information and traffic information. A traveling load of the vehicle is estimated taking into consideration a gradient of a road and an acceleration of the vehicle. The cruising range is then estimated.

In JP 2019-108014 A, only the gradient of the road on which a vehicle is traveling and the acceleration of the vehicle are taken into consideration. Deceleration and vehicle-stopping that are important for estimation of electricity consumption and fuel consumption on a deceleration side occur in locations that are prescribed in advance, such as an intersection that has a traffic light or a bus stop. However, occurrence of these events is indeterminate.

It is thus desired to to provide an energy estimation apparatus that is capable of estimating a cruising range of a vehicle taking into consideration a vehicle speed variation pattern.

One exemplary embodiment of the present disclosure provides an energy estimation apparatus that includes a probability setting unit, a vehicle speed pattern estimation unit, a traveling load estimation unit, and an energy estimation unit. The probability setting unit sets a vehicle speed probability that is a probability of a vehicle reaching a certain vehicle speed on a traveling route that is specified by traveling route information. The vehicle speed pattern estimation unit estimates a vehicle speed variation pattern of the vehicle on the traveling route based on the traveling route information and the vehicle speed probability. The traveling load estimation unit estimates traveling load characteristics of the vehicle on the traveling route. The energy estimation unit estimates energy required for traveling of the vehicle using the traveling load characteristics and the vehicle speed variation pattern.

According to the exemplary embodiment, an energy estimation apparatus that is capable of estimating a cruising range of a vehicle taking into consideration a vehicle speed variation pattern can be provided.

A present embodiment will hereinafter be described with reference to the accompanying drawings. To facilitate understanding of the descriptions, constituent elements that are identical are given the same reference numbers in the drawings when possible. Redundant descriptions are omitted.

FIG. 1 is a diagram for explaining functional constituent elements of an energy estimation apparatus 2 according to the present embodiment. As shown in FIG. 1, the energy estimation apparatus 2 includes a traveling data storage unit 20, a characteristics setting unit 31, a probability setting unit 32, a vehicle speed characteristics information storage unit 41, a traveling route information storage unit 42, a route traffic information storage unit 3, a vehicle speed probability information storage unit 44, a traveling load information storage unit 45, a driver selection unit 51, a vehicle speed pattern estimation unit 52, a traveling load estimation unit 54, an energy estimation unit 55, an efficiency calculation unit 56, and an information display unit 57. In terms of a hardware configuration, the energy estimation apparatus 2 is a computer system that includes a central processing unit (CPU), a memory, a communication interface, and the like.

A vehicle 10 is an example of a vehicle to be a target of estimation by the energy estimation apparatus 2 according to the present embodiment. The vehicle 10 is connected to a network NW. Traveling data of the vehicle 10 is transmitted to the traveling data storage unit 20 over the network NW. For purpose of illustration, only a single vehicle 10 is shown. However, the traveling data may be collected from numerous vehicles. In addition, the target of energy estimation may be numerous vehicles.

The traveling data storage unit 20 stores therein the traveling data that is transmitted from the vehicle 10. The traveling data includes information related traveling, such as information related to acceleration and deceleration of the vehicle 10 and information related to traveling time. As the traveling data, the information related to acceleration and deceleration of the vehicle 10 and the information related to traveling time may be accumulated for each driver. In addition, as the traveling data, the information related to acceleration and deceleration of the vehicle 10 and the information related to traveling time may be accumulated in association with time information regarding the time at which a traveling state of the vehicle 10 occurs. Furthermore, as the traveling data, the information related to acceleration and deceleration of the vehicle and the information related to traveling time may be accumulated in association with weather information regarding the weather when a traveling state of the vehicle 10 occurs.

The characteristics setting unit 31 sets vehicle speed basic characteristics of the vehicle 10 based on the traveling data stored in the traveling data storage unit 20. The vehicle speed basic characteristics include information related to acceleration and deceleration in a vehicle speed variation pattern. The vehicle speed basic characteristics also include traffic information regarding a route. The characteristics setting unit 31 stores the information related to acceleration and deceleration in the vehicle speed characteristics information storage unit 41. The characteristics setting unit 31 stores the traffic information regarding the route in the route traffic information storage unit 43.

The probability setting unit 32 sets a vehicle speed probability that is a probability of a vehicle reaching a predetermined vehicle speed on the traveling route. The vehicle speed for which the vehicle speed probability is set can be arbitrarily determined. As an example, a vehicle-stopping probability of the vehicle speed becoming zero and the vehicle stopping can be set as the vehicle speed probability. A location at which the probability of the vehicle stopping is extremely low and substantially the vehicle does not stop has a vehicle-stopping probability of 0%. A location at which the probability of the vehicle stopping is extremely high and substantially all vehicles stop has a vehicle-stopping probability of 100%. For example, at a location that is on an expressway in which traffic congestion hardly occurs, the vehicle-stopping probability is set to 0%. At a location that is a temporary stop, because the vehicle temporarily stops as long as traffic regulations are followed, the vehicle-stopping probability is set to 100%. For example, when the location is a bus stop, a bus stop where many passengers get on and off the bus has a vehicle-stopping probability that is set to 80% and a bus stop where few passengers get on and off the bus has a vehicle-stopping probability that is set to 20%.

Figure 3:
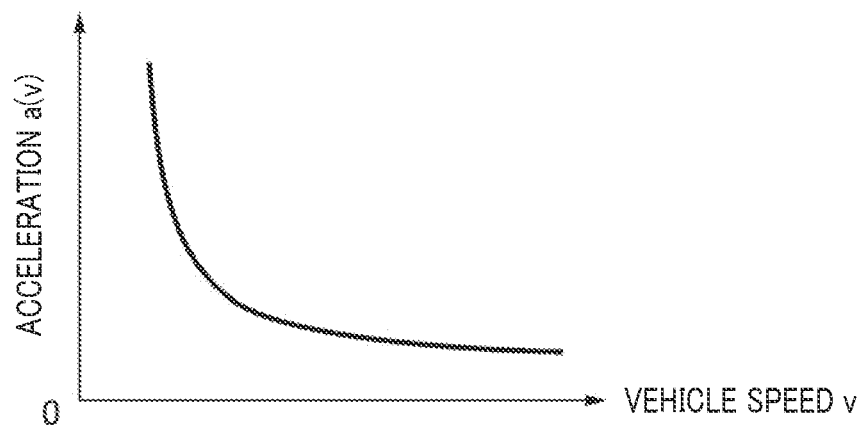
FIG. 3 is a diagram illustrating an example of acceleration information.
Figure 4:
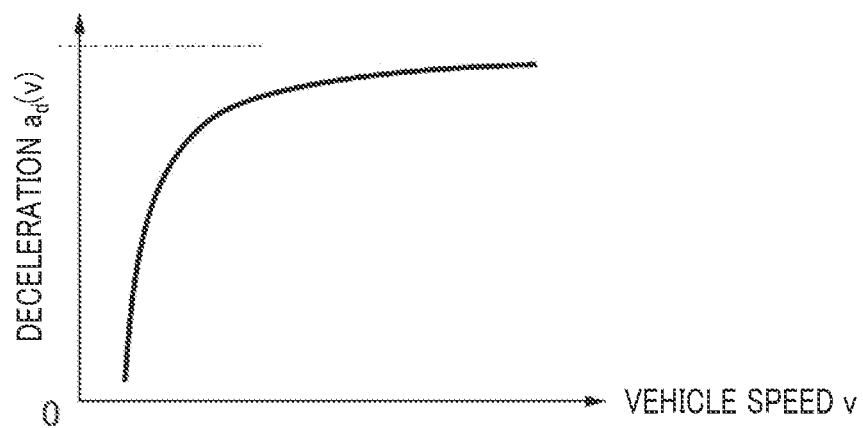
FIG. 4 is a diagram illustrating an example of deceleration information.

The vehicle speed characteristics information storage unit 41 stores therein the vehicle speed variation pattern as vehicle speed characteristics information. The vehicle speed characteristics information may be set for each vehicle type. Alternatively, the vehicle speed characteristics information may be set as information that is common among a plurality of vehicle types. For example, as shown in FIG. 3, information that identifies a relationship between vehicle speed and acceleration is stored as the vehicle speed variation pattern. In addition, as shown in FIG. 4, information that identifies a relationship between vehicle speed and deceleration is stored as the vehicle speed variation pattern. The vehicle speed variation pattern stored in the vehicle speed information storage unit 41 is not limited thereto. The acceleration or deceleration may be a fixed value. The vehicle speed characteristics information may be stored in advance. Alternatively, the vehicle speed characteristics information may be acquired from a server or set by a user each time.

The traveling route information storage unit 42 stores therein route information regarding the traveling route on which the vehicle 10 travels until a timing at which control to estimate a cruising range of the vehicle 10 is performed. Here, for example, the route information includes latitude information, longitude information, elevation information, and location classification information along a course from a current location to a destination on the traveling route on which the vehicle 10 is expected to travel. The latitude information indicates a latitude at a certain location. The longitude information indicates a longitude at a certain location. The elevation information indicates an elevation at a certain location.

The location classification information is information that indicates a classification of the certain location. The classification of a location identifies an element that affects variations in vehicle speed of the vehicle. For example, a classification type 0 indicates a location through which the vehicle travels and passes. A classification type 1 indicates a vehicle-stopping point with a traffic light. A classification type 2 indicates a vehicle-stopping point in a bus stop. A classification type 3 indicates a temporary stop location. A classification type 4 indicates a left/right turn location with no traffic light.

The route traffic information storage unit 43 stores therein the traffic information regarding the traveling route on which the vehicle 10 travels until a timing at which estimation of the cruising range of the vehicle 10 is performed. Here, for example, the traffic information indicates congestion information, construction information, accident information, and traveling conditions that affect a traveling speed of the vehicle such as presence/absence of an intersection or a traffic light, regarding the traveling route. The traffic information also includes information on a legal speed limit.

The vehicle speed probability information storage unit 44 stores therein a vehicle speed probability of the traveling route on which the vehicle 10 is traveling until the timing at which estimation of the cruising range of the vehicle 10 is performed. The vehicle-stopping probability calculated by the probability setting unit 32 is stored in the vehicle speed probability information storage unit 44 as the vehicle speed probability.

The traveling load information storage unit 45 stores therein traveling load information that is required for estimation of a traveling load of the vehicle 10. The traveling load is calculated using acceleration resistance, air resistance, gradient resistance, and rolling resistance. Therefore, information on the acceleration resistance, the air resistance, the gradient resistance, and the rolling resistance is stored as the traveling load information.

The vehicle speed characteristics information storage unit 41, the traveling route information storage unit 42, the route traffic information storage unit 43, the vehicle speed probability information storage unit 44, and the traveling load information storage unit 45 may be provided in physically differing memory apparatuses. Alternatively, for example, the vehicle speed characteristics information storage unit 41, the traveling route information storage unit 42, the route traffic information storage unit 43, the vehicle speed probability information storage unit 44, and the traveling load information storage unit 45 may be provided such as to be integrated in a single memory apparatus.

The driver selection unit 51 selects a driver to be an estimation target. The driver selection unit 51 outputs information identifying the selected driver to the vehicle speed pattern estimation unit 52.

The vehicle speed pattern estimation unit 52 estimates a pattern of a relationship between distance and vehicle speed based on the vehicle speed probability and an acceleration/deceleration pattern. When a specific target driver is selected, the vehicle speed pattern estimation unit 52 estimates the pattern of the relationship between the distance and the vehicle speed that is adapted to the target driver. The vehicle speed pattern estimation unit 52 estimates a pattern of a relationship between the vehicle speed and time, by taking into consideration an amount of time over which the vehicle speed is maintained in the pattern of the relationship between the distance and the vehicle speed.

The traveling load estimation unit 54 estimates the traveling load based on the pattern of the relationship between the distance and the vehicle speed estimated by the vehicle speed pattern estimation unit 52 and the traveling load information stored in the traveling load information storage unit 45. The energy estimation unit 55 estimates energy required for traveling based on the traveling load estimated by the traveling load estimation unit 54.

The efficiency calculation unit 56 calculates efficiency, such as electricity consumption and fuel consumption, based on the required energy estimated by the energy estimation unit 55 and a traveling distance. The traveling distance may be determined by time integration of the vehicle speed variation patterns estimated by the vehicle speed pattern estimation unit 52. Alternatively, the traveling distance may be determined by integration of distances between locations identified by the latitude information and the longitude information. The information display unit 57 notifies the user of the efficiency calculated by the efficiency calculation unit 56.

Next, an information processing flow using the energy estimation apparatus 2 will be described with reference to FIG. 2. At step S101, the vehicle speed pattern estimation unit 52 selects a vehicle type. The vehicle type may be selected based on information inputted by the user. Alternatively, the vehicle type may be set in advance.

At step S102 following step S101, the vehicle speed pattern estimation unit 52 sets basic characteristics of the vehicle speed variation pattern. More specifically, the vehicle speed pattern estimation unit 52 acquires and sets the information related to acceleration and deceleration in the vehicle speed variation pattern. The vehicle speed pattern estimation unit 52 acquires the information related to acceleration and deceleration from the information stored in the vehicle speed characteristics information storage unit 41.

The vehicle speed pattern estimation unit 52 may acquire the information related to acceleration and deceleration from information stored on another server. The vehicle speed pattern estimation unit 52 may acquire the information related to acceleration and deceleration from information that is manually set by the user. The acceleration and deceleration may be fixed values. Alternatively, the acceleration and deceleration may be defined by functions that are correlated to vehicle speed, as shown in examples in FIG. 3 and FIG. 4. The vehicle speed pattern estimation unit 52 outputs the set basic characteristics of the vehicle speed variation pattern to the traveling load estimation unit 54.

At step S103 following step S102, the vehicle speed pattern estimation unit 52 acquires the traveling route information. The traveling route information is stored in the traveling route information storage unit 42. At step S104 following step S103, the vehicle speed pattern estimation unit 52 acquires the traffic information. The traffic information is stored in the route traffic information storage unit 43. At step S105 following step S104, the vehicle speed pattern estimation unit 52 acquires the vehicle-stopping probability. The vehicle-stopping probability is stored in the vehicle speed probability information storage unit 44.

Figure 5:
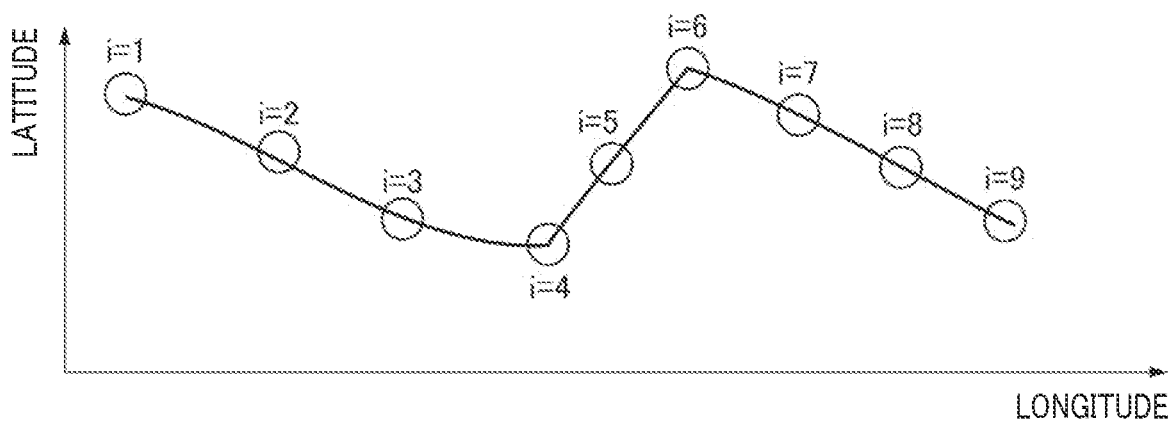
FIG. 5 is a diagram illustrating an example of traveling data.

An example of the traveling route information, the traffic information, and the vehicle-stopping probability acquired by the vehicle speed pattern estimation unit 52 will be described with reference to FIG. 5 and FIG. 6. FIG. 5 is an example of the traveling route information. The latitude information and the longitude information are set for nine locations that are location i=1, 2, 3, 4, 5, 6, 7, 8, and 9.

FIG. 6 shows an example of the traveling route information, the traffic information, and the probability information for each location given as examples in FIG. 5. The location i=1 has a latitude (1), a longitude (1), an elevation (1), a classification type 2, a legal speed limit of 50 km/h, and a vehicle-stopping probability of 100%. The classification type 2 is a vehicle-stopping point in a bus stop. In the case of the present example, a starting/terminal station of a bus is assumed. The location i=2 has a latitude (2), a longitude (2), an elevation (2), a classification type 2, a legal speed limit of 50 km/h, and a vehicle-stopping probability of 10%. The classification type 2 is a vehicle-stopping point in a bus stop.

The location i=3 has a latitude (3), a longitude (3), an elevation (3), a classification type 1, a legal speed limit of 50 km/h, and a vehicle-stopping probability of 10%. The classification type 1 is a vehicle-stopping point with a traffic light.

The location i=4 has a latitude (4), a longitude (4), an elevation (4), a classification type 3, a legal speed limit of 50 km/h, and a vehicle-stopping probability of 100%. The classification type 3 is a temporary stop location. The location i=5 has a latitude (5), a longitude (5), an elevation (5), a classification type 0, a legal speed limit of km/h, and a vehicle-stopping probability of 0%. The classification type 0 is a location through which the vehicle travels and passes. The location i=6 has a latitude (6), a longitude (6), an elevation (6), a classification type 1, a legal speed limit of 40 km/h, and a vehicle-stopping probability of 80%. The classification type 1 is a vehicle-stopping point with a traffic light.

The location i=7 has a latitude (7), a longitude (7), an elevation (7), a classification type 4, a legal speed limit of 50 km/h, and a vehicle-stopping probability of 100%. The classification type 4 is a left/right turn location with no traffic light. The location i=8 has a latitude (8), a longitude (8), an elevation (8), a classification type 2, a legal speed limit of 50 km/h, and a vehicle-stopping probability of 20%. The classification type 2 is a vehicle-stopping point in a bus stop. The location i=9 has a latitude (9), a longitude (9), an elevation (9), a classification type 2, a legal speed limit of 50 km/h, and a vehicle-stopping probability of 100%. The classification type 2 is a vehicle-stopping point in a bus stop.

Figure 2:
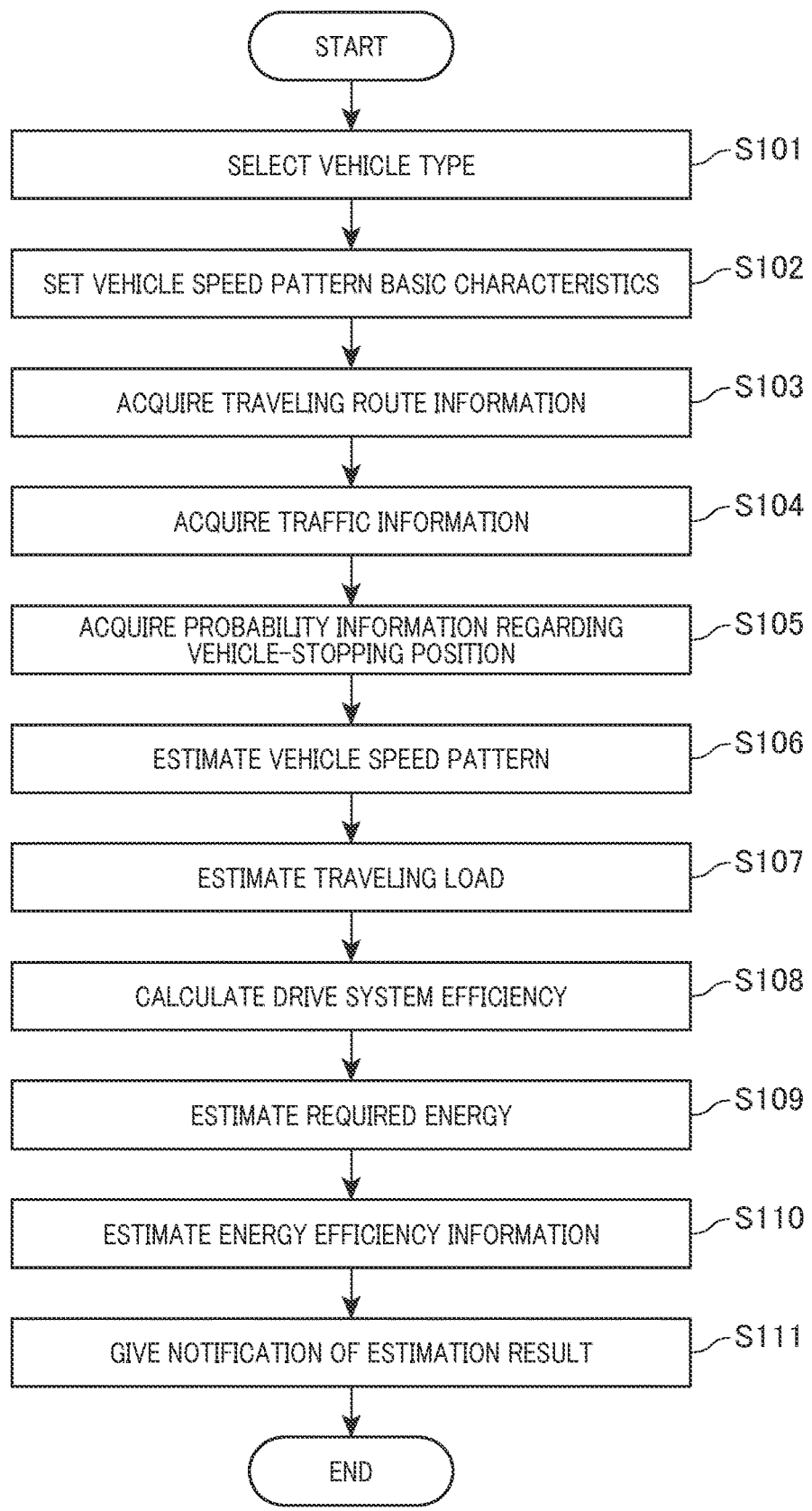
FIG. 2 is a flowchart for explaining an information processing flow using the energy estimation apparatus shown in FIG. 1.

The description will be continued with reference to FIG. 2. At step S106 following step S105, the vehicle speed pattern estimation unit 52 estimates the vehicle speed variation pattern. The vehicle speed pattern estimation unit 52 estimates the vehicle speed variation pattern based on the basic characteristics set at step S102, and the traveling route information, the traffic information, and the vehicle-stopping probability acquired at steps S103, S104, and S105.

The vehicle speed variation pattern estimated by the vehicle speed pattern estimation unit 52 will be described with reference to FIG. 7. The vehicle speed variation pattern shown in FIG. 7 is estimated by the vehicle speed pattern estimation unit 52 based on the traveling route information, the traffic information, and the vehicle-stopping probability given as examples in FIG. 5 and FIG. 6. A vehicle that departs the location i=1 accelerates to the legal speed limit of 50 km/h. The acceleration is the acceleration set at step S102. The location i=2 has a low vehicle-stopping probability of 10%. Therefore, according to the present embodiment, the vehicle 10 is assumed to pass through the location i=2 without stopping.

The location i=3 has a low vehicle-stopping probability of 10%. Therefore, according to the present embodiment, the vehicle 10 is assumed to pass through the location i=3 without stopping. The location i=4 has a vehicle-stopping probability of 100%. Therefore, the vehicle stops. The vehicle that is heading towards the location i=4 decelerates from the legal speed limit of 50 km/h. The deceleration is the deceleration set at step S102. The vehicle that temporarily stops at the location i=4 accelerates to the legal speed limit of 40 km/h. The acceleration is the acceleration set at step S102.

The location i=5 has a vehicle-stopping probability of 0%. Therefore, the vehicle passes through the location i=5. The location i=6 has a high vehicle-stopping probability of 80%. Therefore, according to the present embodiment, the vehicle is assumed to stop at the location i=6. The vehicle that is heading towards the location i=6 decelerates from the legal speed limit of 40 km/h. The deceleration is the deceleration set at step S102. The vehicle that temporarily stops at the location i=6 accelerates to the legal speed limit of 50 km/h. The acceleration is the acceleration set at step S102.

The location i=7 has a vehicle-stopping probability of 100%. Therefore, the vehicle stops at the location i=7. The vehicle that is heading towards the location i=7 decelerates from the legal speed limit of 50 km/h. The deceleration is the deceleration set at step S102. The vehicle that temporarily stops at the location i=7 accelerates to the legal speed limit of 50 km/h. The acceleration is the acceleration set at step S102.

The location i=8 has a low vehicle-stopping probability of 20%. Therefore, according to the present embodiment, the vehicle is considered to pass through the location i=8 without stopping. The location i=9 has a vehicle-stopping probability of 100%. Therefore, the vehicle stops at the location i=9. The vehicle that is heading towards the location i=9 decelerates from the legal speed limit of 50 km/h. The deceleration is the deceleration set at step S102.

Figure 8A:
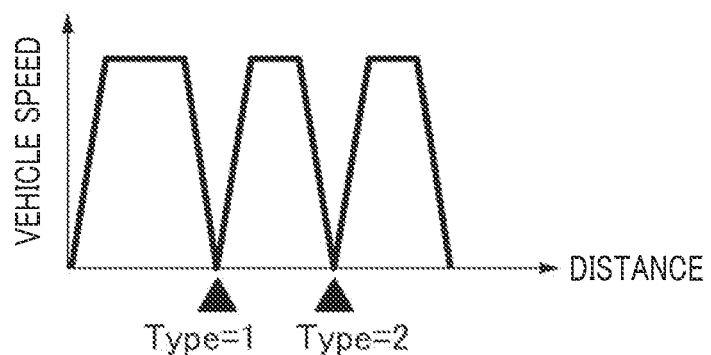
FIG. 8A and FIG. 8B are diagrams illustrating an example in which a relationship between vehicle speed and distance is converted to a relationship between vehicle speed and time.
Figure 8B:
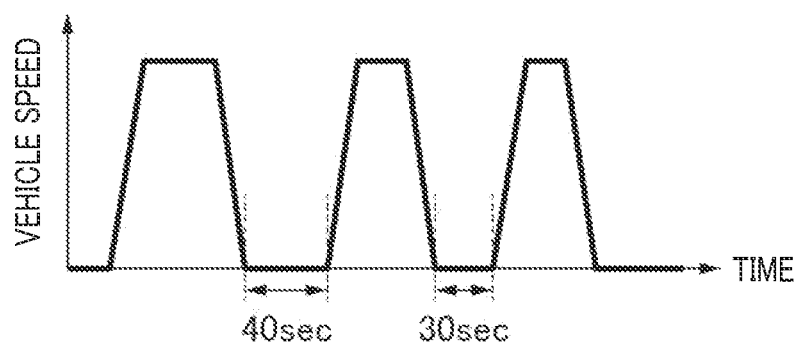

After the vehicle speed variation pattern for positions such as those shown in FIG. 7 is estimated, the vehicle speed pattern estimation unit 52 converts the vehicle speed variation pattern to a vehicle speed variation pattern in relation to a time axis. The vehicle speed pattern estimation unit 52 changes a vehicle stop duration based on the classification type of the location. An example of the vehicle stop duration being changed will be described with reference to FIG. 8. FIG. 8A shows an example of the vehicle speed variation pattern in relation to position. In the example shown in FIG. 8A, a first vehicle-stopping location is the classification type 1 and a next vehicle-stopping location is the classification type 2. The classification type 1 is the vehicle-stopping point with the traffic light. Therefore, 40 seconds are set as the vehicle stop duration. The classification type 2 is the vehicle-stopping point in the bus stop. Therefore, 30 seconds are set as the vehicle stop duration. When the vehicle stop durations are reflected, the vehicle speed variation pattern in relation to a time axis shown in FIG. 8B can be generated.

The description will be continued with reference to FIG. 2. At step S107 following step S106, the traveling load estimation unit 54 estimates the traveling load. The traveling load can be estimated from the acceleration resistance, the air resistance, the gradient resistance, and the rolling resistance. The traveling load can be indicated by traveling resistance or traveling horsepower. The traveling resistance can be calculated using parameters such as a gross vehicle weight, drag coefficient, frontal projected area, and rolling resistance coefficient. These parameters are stored in the traveling load information storage unit 45 for each vehicle type selected at step S101.

A traveling resistance $F_{drv}(t)$ is estimated using the following expression (f01).

$$F_{drv}(t)=Wa(t)+0.5*\rho*Cd*Av^2(t)+\mu Wg+Wg \sin \theta(t) \quad \text{(f01)}$$

t: time
W: gross vehicle weight
a(t): acceleration at time t
ρ: air density
Cd: coefficient of drag
A: frontal projected area
v(t): speed at time t
μ: rolling resistance coefficient
g: gravitational acceleration
θ(t): gradient between location at time t and location at time t−1

The air density p may be a fixed value of 1.293 kg/m³. The air density p may be calculated from air temperature. The gravitational acceleration g may be a fixed value of 9.8 m/s². The gradient θ(t) can be determined from the latitude and longitude information and the elevation information in the traveling route information as shown in the example in FIG. 6.

A traveling horsepower $P_{drv}(t)$ is estimated using the following expression (f02).

$$P_{drv}(t)=F_{drv}(t)*v(t) \tag{f02}$$

When the vehicle-stopping probability at time t is Prob(t), regarding a vehicle speed variation pattern $v_2(t)$ of vehicle-stopping that may occur with the probability Prob(t) and a vehicle speed variation pattern $v_1(t)$ of pass-through that may be occur with a probability 100-Prob(t), traveling resistance $F_{drv\_1}(t)$ and $F_{drv\_2}(t)$ and traveling horsepower $P_{drv\_1}(t)$ and $P_{drv\_2}(t)$ can be calculated by following expressions (f03), (f04), (f05), and (f06). Suffixes hereafter are 2 for a vehicle-stopping pattern and 1 for a pass-through pattern.

$$F_{drv\_1}(t)=Wa(t)+0.5*\rho*Cd*Av_1^2(t)+\mu Wg=Wg \sin \theta_1(t) \tag{f03}$$

$$F_{drv\_2}(t)=Wa(t)+0.5*\rho*Cd*Av_2^2(t)+\mu Wg=Wg \sin \theta_2(t) \tag{f04}$$

$$P_{drv\_1}(t)=F_{drv\_1}(t)*v_1(t) \tag{f05}$$

$$P_{drv\_2}(t)=F_{drv\_2}(t)*v_2(t) \tag{f06}$$

Figure 9:
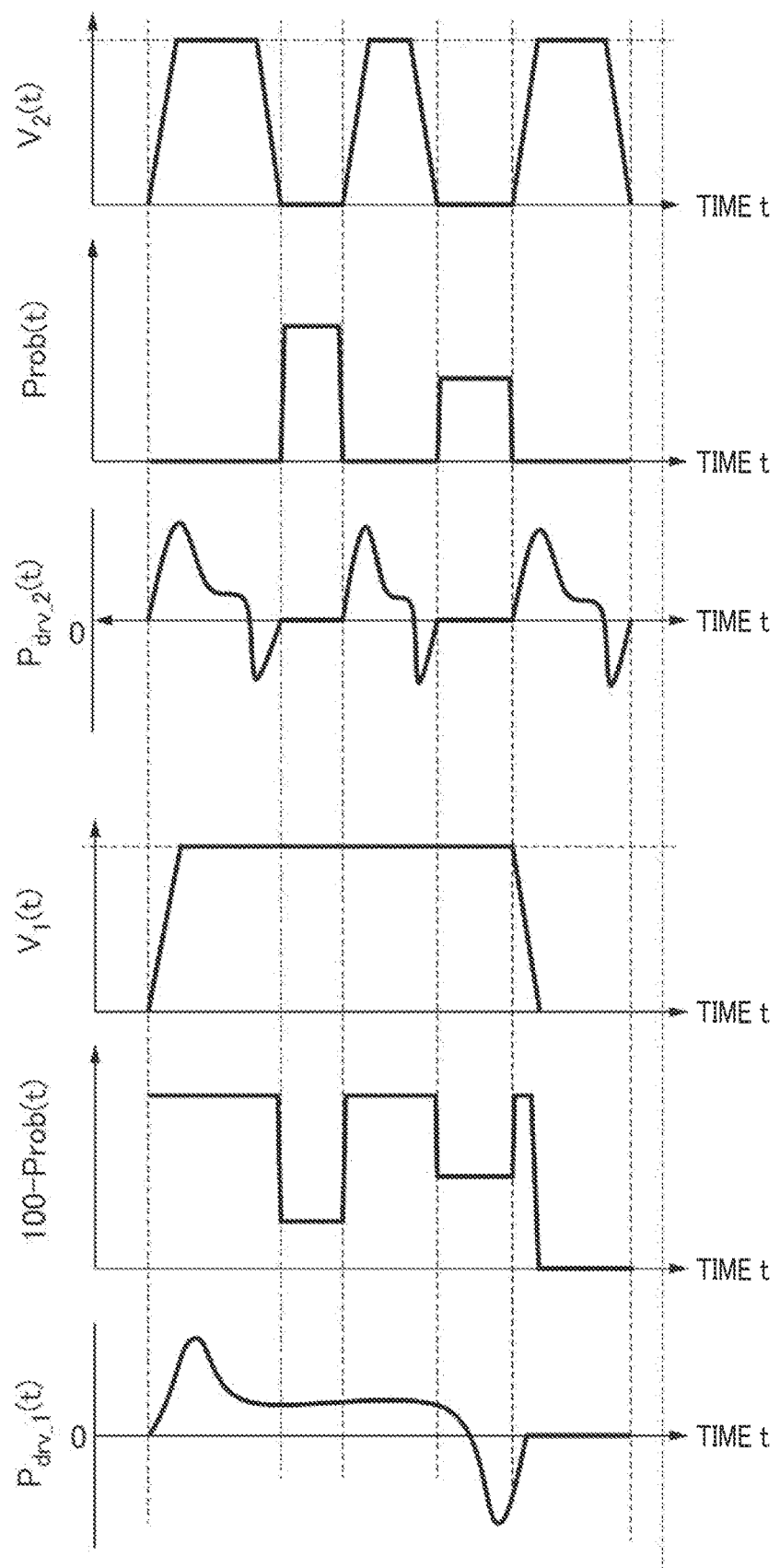
FIG. 9 is a diagram illustrating an example of energy estimation.

FIG. 9 shows an example of an illustration of calculation results.

The description will be continued with reference to FIG. 2. At step S108 following step S107, the energy estimation unit 55 calculates drive system efficiency. At step S109 following step S108, the energy estimation unit 55 estimates a required energy amount.

Figure 10:
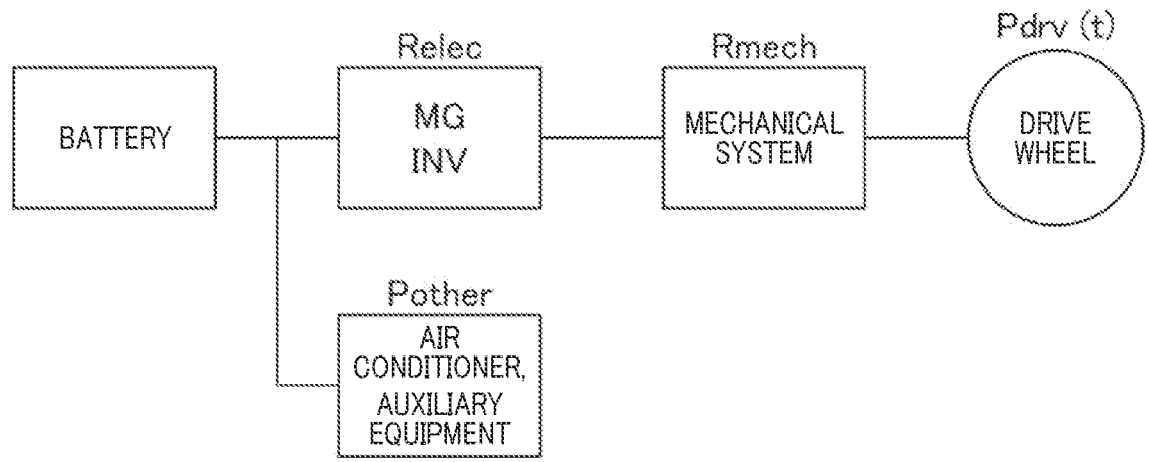
FIG. 10 is a diagram for explaining energy estimation in an electric automobile.

FIG. 10 shows an example of a system in a case of an electric automobile. In the system shown in the example in FIG. 10, system efficiency of an electrical system (MG-INV) is $R_{elec}$ and efficiency of a mechanical system is $R_{mech}$. A fixed value of 70% can be used as the efficiency $R_{mech}$ of the mechanical system. The efficiency $R_{mech}$ of the mechanical system indicates that energy that is inputted to the mechanical system is transmitted to a drive wheel at the efficiency $R_{mech}$, and the traveling horsepower $P_{drv}(t)$ is generated. Therefore, energy $P'_{drv}(t)$ that is inputted to the mechanical system can be calculated by following expressions (f07) and (f08).

$$P'_{drv\_1}(t)=P_{drv\_1}(t)/R_{mech} \tag{f07}$$

$$P'_{drv\_2}(t)=P_{drv\_2}(t)/R_{mech} \tag{f08}$$

Figure 11:
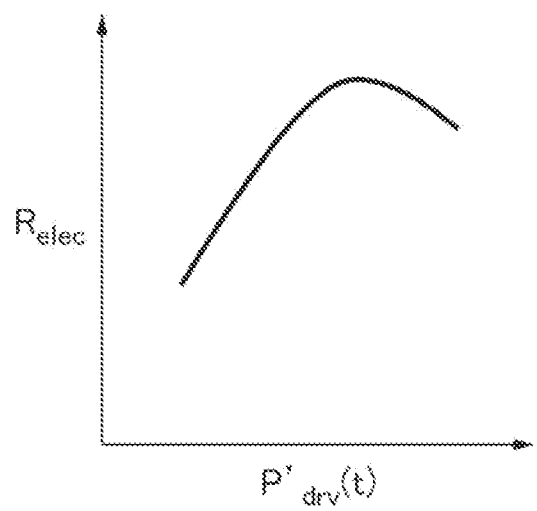
FIG. 11 is a diagram illustrating an example of electrical system efficiency in energy estimation.

The efficiency $R_{elec}$ of the electrical system is prescribed as shown in the example in FIG. 11, for example, by a function with energy that is inputted from the electrical system to the mechanical system. The efficiency $R_{elec}$ of the electrical system is a function of the energy $P'_{drv}(t)$ that is inputted to the mechanical system and can be calculated by following expressions (f09) and (f10).

$$R_{elec\_1}=f(P'_{drv\_1}(t)) \tag{f09}$$

$$R_{elec\_2}=f(P'_{drv\_2}(t)) \tag{f10}$$

Energy $P'_{drv}(t)$ for traveling that is supplied to the electrical system can be calculated by following expressions (f11) and (f12).

$$P''_{drv\_1}(t)=P'_{drv\_1}(t)/R_{elec\_1} \tag{f11}$$

$$P''_{drv\_2}(t)=P'_{drv\_2}(t)/R_{elec\_2} \tag{f12}$$

Energy that is required for driving an air conditioner and auxiliary equipment is $P_{other}(t)$. $P_{other}(t)$ may be a fixed value of 5 kW.

A predicted value $P_{sum}(t)$ of required power can be calculated by the following expression (f13) using the vehicle-stopping probability Prob(t).

$$P_{sum}(t)=((100-\text{Prob}(t))100*P''_{drv\_1}(t)+\text{Prob}(t)/100*P''_{drv\_2}(t))+P_{other}(t) \tag{f13}$$

When $P_{sum}(t)<0$, energy is stored in a battery as regenerative energy. The energy estimation unit 55 performs time integration of $P_{sum}(t)$ and calculates a required energy amount $E_{sum}$ by the following expression (f14).

$$E_{sum}=\Sigma(P_{sum}(t)*(t-(t-1))) \tag{f14}$$

Figure 12:
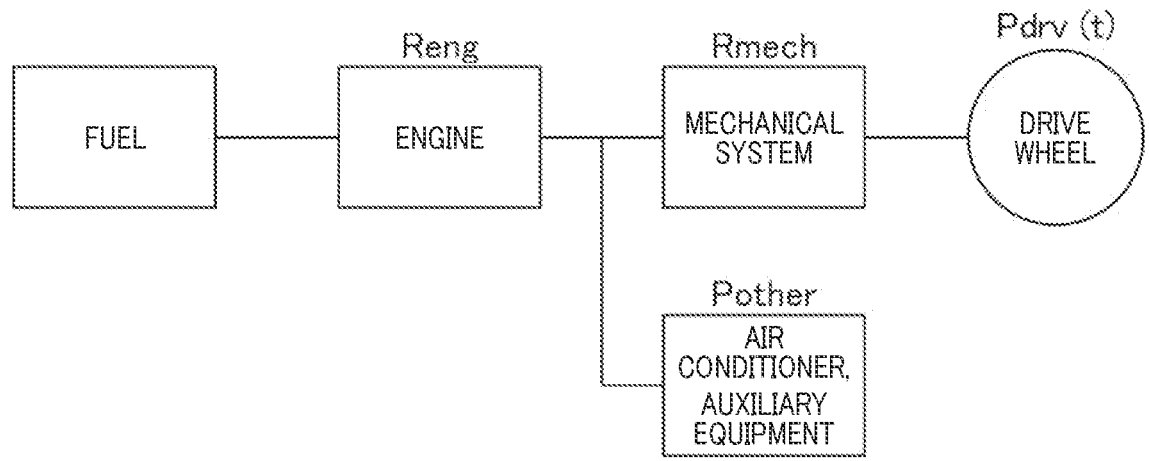
FIG. 12 is a diagram illustrating an example of engine efficiency in energy estimation in an engine automobile.

The present embodiment can also be applied to an engine automobile, in addition to the electric automobile. FIG. 12 shows an example of a system in a case of an engine automobile. In the system shown in the example in FIG. 12, engine efficiency is $R_{eng}$. The efficiency of the mechanical system is $R_{mech}$. A fixed value of 70% can be used as the efficiency $R_{mech}$ of the mechanical system. The efficiency $R_{mech}$ of the mechanical system indicates that energy that is inputted to the mechanical system is transmitted to the drive wheel at the efficiency $R_{mech}$, and the traveling horsepower $P_{drv}(t)$ is generated. Therefore, energy $P'_{drv}(t)$ that is inputted to the mechanical system can be calculated by following expressions (f15) and (f16).

$$P'_{drv\_1}(t)=P_{drv\_1}(t)/R_{mech} \tag{f15}$$

$$P'_{drv\_2}(t)=P_{drv\_2}(t)/R_{mech} \tag{f16}$$

In addition to the energy for traveling, energy for driving the air conditioner and auxiliary equipment is also supplied from the engine. The energy that is required for driving the air conditioner and auxiliary equipment is $P_{other}(t)$. $P_{other}(t)$ may be a fixed value of 5 kW.

Figure 13:
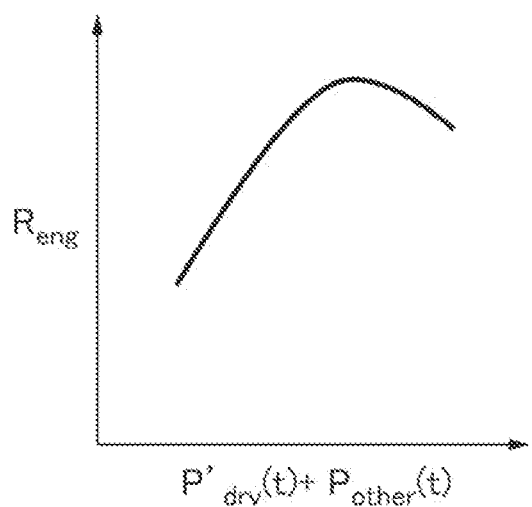
FIG. 13 is a diagram illustrating an example of engine efficiency in energy estimation.

The engine efficiency $R_{eng}$ is a function of the energy that is inputted to the mechanical system from the engine and the energy for driving auxiliary equipment. For example, the engine efficiency $R_{eng}$ is prescribed as shown in the example in FIG. 13. The engine efficiency $R_{eng}$ is a function $P_{sum}(t)$ and can be calculated by the following expression (f17).

$$R_{eng}=g(P_{sum}(t)) \tag{f17}$$

A predicted value $P'_{sum}(t)$ of power is calculated by following expressions (f18) and (f19), using the vehicle-stopping probability Prob(t).

$$P_{sum}(t)=((100-\text{Prob}(t))100*P'_{drv\_1}(t)+\text{Prob}(t)/100*P'_{drv\_2}(t))+P_{other}(t) \tag{f18}$$

$$P'_{sum}(t)=P_{sum}(t)/R_{eng} \tag{f19}$$

Because charging with regenerative energy is not performed in the engine automobile, only a positive numeric value is applicable.

$$P''_{sum}(t)=P'_{sum}(t)(P'_{sum}(t)>0 \tag{f20}$$

The energy estimation unit 55 performs time integration of $P''_{sum}(t)$, and calculates the required energy amount $E_{sum}$ by the following expression (f21).

$$E_{sum}=\Sigma(P''_{sum}(t)*(t-(t-1)) \tag{f21}$$

At step S110 following step S109, the efficiency calculation unit 56 estimates energy efficiency information. The required energy amount $E_{sum}$ calculated at step S109 is used as the required energy amount $E_{sum}$. The efficiency calculation unit 56 can determine a traveling distance L from the time integration of the vehicle speed variation pattern. The efficiency calculation unit 56 may also calculate the traveling distance L from the latitude information and the longitude information. Energy efficiency $EC_{ev}$ in the case of the electric automobile can be determined by the following expression (f22).

$$EC_{ev}=L/E_{sum} \qquad (f22)$$

The efficiency calculation unit 56 determines a cruising range $L_{drv\_ev}$ by the following expression (f23) using the energy efficiency $EC_{ev}$ and battery capacity SOC.

$$L_{drv\_ev}=SOC*EC_{ev} \qquad (f23)$$

In the case of the engine automobile, the energy amount $E_{sum}$ is converted to a fuel amount $L_{fuel}$ using a heat generation amount $C_{fuel}$. The efficiency calculation unit 56 calculates the fuel amount $L_{fuel}$ by the following expression (f24).

$$L_{fuel}=E_{sum}/C_{fuel} \qquad (f24)$$

The efficiency calculation unit 56 calculates energy efficiency $EC_{icev}$ by the following expression (f25).

$$EC_{icev}=L/L_{fuel} \qquad (f25)$$

The efficiency calculation unit 56 determines a cruising range $L_{drv\_icev}$ by the following expression (f26) using the energy efficiency $EC_{icev}$ and a loading fuel capacity $L_{fuel\_tank}$.

$$L_{drv\_icev}=L_{fuel\_tank}*EC_{icev} \qquad (f26)$$

Figure 14:
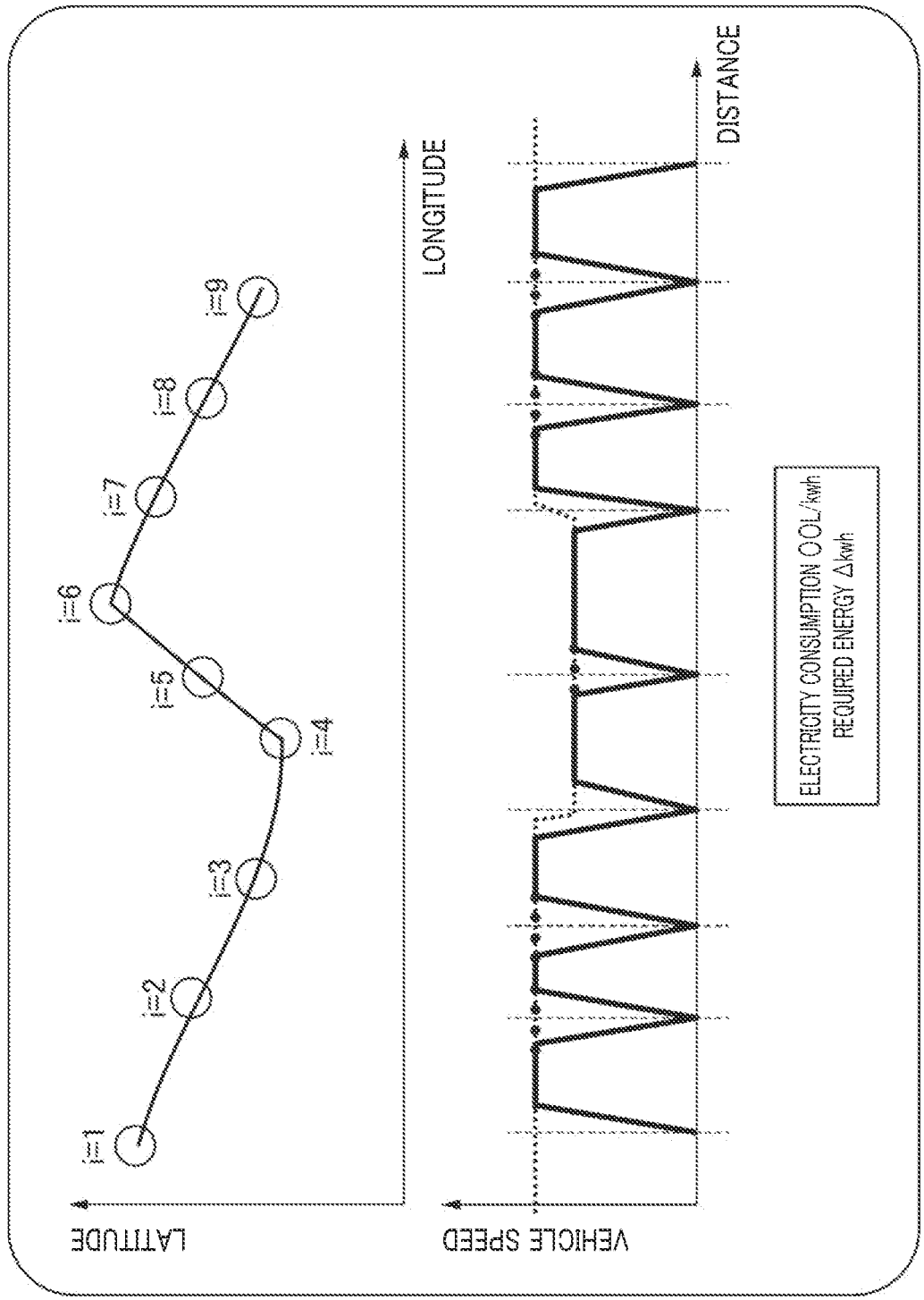
FIG. 14 is a diagram illustrating an example of information display.

At step S111 following step S110, the information display unit 57 notifies the user of information related to the energy efficiency calculated at step S110. A mode of notification is not particularly limited. The user is notified of information such as that in the example in FIG. 14 through use of an application or the like.

Next, a mode of setting vehicle speed variation pattern basic characteristics will be described with reference to FIG. 15. At step S201, the characteristics setting unit 31 calculates the vehicle speed variation pattern basic characteristics using data stored in the traveling data storage unit 20. An example of the information stored in the traveling data storage unit 20 is shown in FIG. 16.

FIG. 16A shows a state in which data of an acceleration state in which the vehicle speed increases in relation to a time axis is accumulated. An average acceleration can be calculated based on data such as that in the example in FIG. 16A.

FIG. 16B shows a state in which data of a deceleration state in which the vehicle speed decreases in relation to the time axis is accumulated. An average deceleration can be calculated based on data such as that in the example in FIG. 16B.

FIG. 16C shows a state in which data when the vehicle speed is within a fixed range in relation to the time axis is accumulated. An average steady-state speed can be calculated based on data such as that in the example in FIG. 16C. For example, when numerous vehicles are traveling at vehicle speeds that are higher than the legal speed limit, a vehicle speed setting that better corresponds to an actual state can be performed.

At step S202 following step S201, the probability setting unit 32 calculates vehicle-stopping probability information regarding the route. For example, when the classification type of a location is 0, the location is a location through which the vehicle passes. Therefore, the probability setting unit 32 does not calculate the vehicle-stopping probability. For example, when the classification type of a location is 1, the location is a vehicle-stopping point with a traffic light. Therefore, the probability setting unit 32 calculates the vehicle-stopping probability. For example, when the classification type of a location is 2, the location is a vehicle-stopping point in a bus stop. Therefore, the probability setting unit 32 calculates the vehicle-stopping probability.

Figure 17:
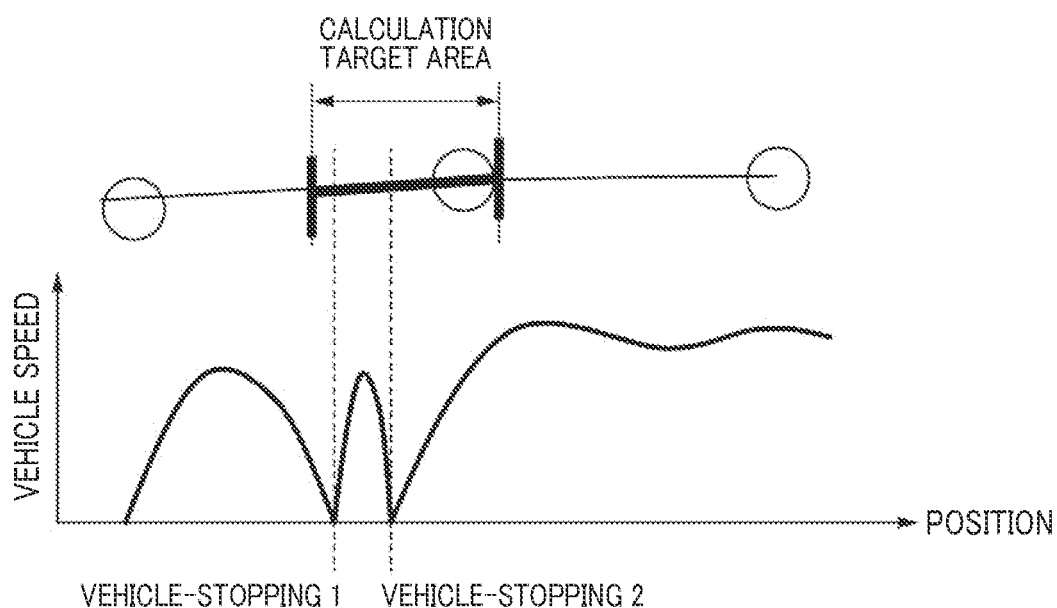
FIG. 17 is a diagram illustrating an example of calculation of vehicle-stopping probability.

For example, the probability setting unit 32 sets a fixed area that includes the location for which the vehicle-stopping probability is calculated as a calculation target area. When the vehicle stops within the calculation target area, the probability setting unit 32 considers the vehicle to have stopped. As shown in an example in FIG. 17, the vehicle stops twice in the calculation target area. In such cases, the probability setting unit 32 can consider the vehicle to have stopped once.

The probability setting unit 32 calculates a vehicle-stopping probability Prob(i) by the following expression (f27) when the data indicating vehicle-stopping is found M times within N pieces of data within the calculation target area.

$$\mathrm{Prob}(i)=M/N*100 \qquad (f27)$$

When the process at step S202 is ended, the process advances to step S101 in FIG. 2. Subsequent processes are similar to those already described. Therefore, descriptions thereof are omitted.

Figure 18:
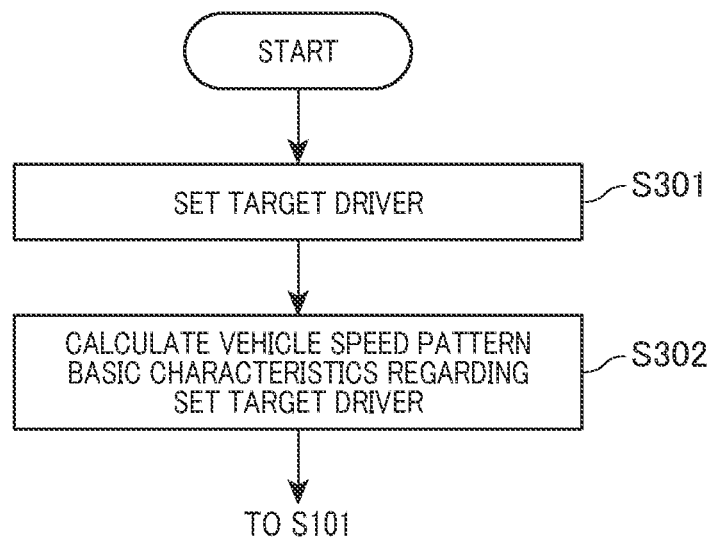
FIG. 18 is a flowchart for explaining an information processing flow using the energy estimation apparatus shown in FIG. 1, the information processing flow including a process for performing energy estimation for each driver.

Next, a mode for setting the vehicle speed variation pattern basic characteristics for each driver will be described with reference to FIG. 18. At step S301, the driver selection unit 51 sets a target driver. The driver selection unit 51 sets the target driver based on a selection operation on a screen by the user or the like.

At step S302 following step S301, the vehicle speed pattern estimation unit 52 extracts the acceleration data, the deceleration data, and the average steady-state vehicle speed data of the selected driver as the vehicle speed variation pattern basic characteristics.

When the process at step S302 is ended, the process advances to step S101 in FIG. 2. Subsequent processes are similar to those already described. Therefore, descriptions thereof are omitted.

Figure 19:
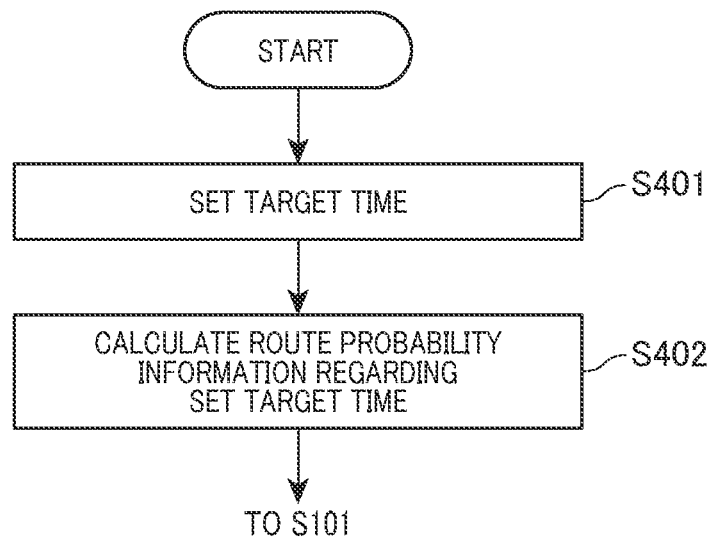
FIG. 19 is a flowchart for explaining an information processing flow using the energy estimation apparatus shown in FIG. 1, the information processing flow including a route probability calculation process that takes into consideration time.

Next, a mode for calculating route probability information for each time will be described with reference to FIG. 19. At step S401, the probability setting unit 32 sets a target time. At step S402 following step S401, the route probability information for the set target time is calculated. More specifically, the vehicle-stopping probability of a location at the target time is calculated based on the vehicle speed data that is accumulated in association with time. The vehicle speed pattern estimation unit 52 uses data at the target time as the vehicle speed probability information.

When the process at step S402 is ended, the process advances to step S101 in FIG. 2. Subsequent processes are similar to those already described. Therefore, descriptions thereof are omitted.

Figure 20:
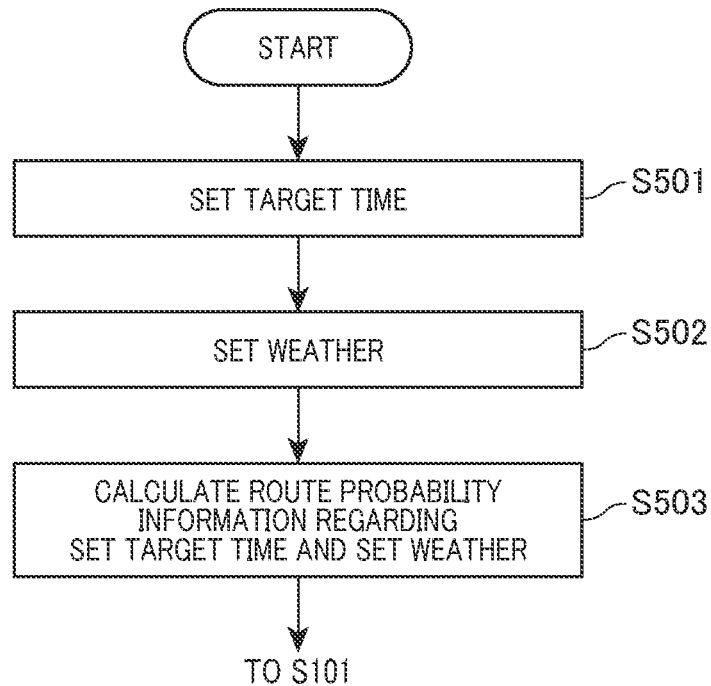
FIG. 20 is a flowchart for explaining an information processing flow using the energy estimation apparatus shown in FIG. 1, the information processing flow including a route probability calculation process that takes into consideration weather conditions.

Next, a mode for calculating the route probability information taking into consideration weather will be described with reference to FIG. 20. The traveling data storage unit 20 stores therein traveling data in association with weather information. At step S501, the probability setting unit 32 sets the target time. At step S502 following step S501, the weather is set. At step S503 following step S502, the vehicle-stopping probability information corresponding to the time information and the weather information is calculated. More specifically, the vehicle-stopping probability of the location at the target time and in the target weather is calculated based on the vehicle speed data that is accumulated in association with time and weather. The vehicle speed pattern estimation unit 52 uses the data at the target time and in the target weather as the vehicle speed probability information.

When the process at step S502 is ended, the process advances to step S101 in FIG. 2. Subsequent processes are similar to those already described. Therefore, descriptions thereof are omitted.

The energy estimation apparatus 2 according to the present embodiment includes the probability setting unit 32, the vehicle speed pattern estimation unit 52, the traveling load estimation unit 54, and the energy estimation unit 55. The probability setting unit 32 sets a vehicle speed probability that is a probability of the vehicle reaching a certain vehicle speed on a traveling route that is identified by traveling route information. The vehicle speed pattern estimation unit 52 estimates a vehicle speed variation pattern of the vehicle on the traveling route based on the traveling route information and the vehicle speed probability. The traveling load estimation unit 54 estimates traveling load characteristics of the vehicle on the traveling route. The energy estimation unit 55 estimates energy that is required for traveling of the vehicle using the traveling load characteristics and the vehicle speed variation pattern.

The vehicle speed variation pattern is estimated using the vehicle speed probability that is the probability of the vehicle reaching a certain vehicle speed. The energy required for traveling is estimated together with the traveling load. Therefore, energy estimation that is closer to reality can be performed.

According to the present embodiment, the vehicle speed probability is a vehicle-stopping probability of the vehicle stopping at a certain location. A vehicle-stopping state in the variations in vehicle speed significantly affects the energy required for traveling. Therefore, energy estimation that is closer to reality can be performed through use of the vehicle-stopping probability as the vehicle speed probability.

According to the present embodiment, the vehicle speed pattern estimation unit 52 estimates the vehicle speed variation pattern when the vehicle stops at a certain location as a vehicle-stopping pattern using the vehicle speed probability. The vehicle speed pattern estimation unit 52 estimates the vehicle speed variation pattern when the vehicle passes through a certain location as a pass-through pattern using the vehicle speed probability. The traveling load estimation unit 54 estimates the traveling load characteristics of the vehicle corresponding to each of the vehicle-stopping pattern and the pass-through pattern. The energy estimation unit 55 estimates the energy required for traveling of the vehicle corresponding to each of the vehicle-stopping pattern and the pass-through pattern.

As a result of the vehicle-stopping pattern and the pass-through pattern being combined, energy estimation based on respective predicted values of the vehicle-stopping pattern and the pass-through pattern can be performed.

According to the present embodiment, the vehicle speed probability is the vehicle-stopping probability of the vehicle stopping at a certain location. The vehicle speed pattern estimation unit 52 estimates the vehicle-stopping pattern using the vehicle-stopping probability. The vehicle speed pattern estimation unit 52 calculates a pass-through probability when the vehicle passes through a certain location using the vehicle-stopping probability and estimates the pass-through pattern using the pass-through probability.

A vehicle-stopping state in the variations in vehicle speed significantly affects the energy required for traveling. Therefore, energy estimation that is closer to reality can be performed through estimation of the vehicle-stopping pattern using the vehicle-stopping probability. Because a state in which the vehicle does not stop is a state in which the vehicle passes through a location, the pass-through probability can be calculated using the vehicle-stopping probability. As a result of the pass-through pattern being estimated using the pass-through probability, energy estimation that is closer to reality can be performed.

According to the present embodiment, the vehicle speed pattern estimation unit 52 estimates the vehicle speed variation pattern using traffic information regarding the traveling route.

According to the present embodiment, the energy estimation apparatus 2 includes the traveling data storage unit 20 that accumulates traveling data of a general-use vehicle. The probability setting unit 32 sets the vehicle-stopping probability using the traveling data. The vehicle speed pattern estimation unit 52 estimates the vehicle speed variation pattern using the traveling data.

According to the present embodiment, the energy estimation apparatus 2 includes the driver selection unit 51 that selects a driver. The traveling data storage unit 20 accumulates the traveling data of the general-use vehicle in association with the driver. The vehicle speed pattern estimation unit 52 estimates the vehicle speed variation pattern using the traveling data that is associated with the driver selected by the driver selection unit 51.

According to the present embodiment, the traveling data storage unit 20 accumulates the traveling data of the general-use vehicle in association with time period. The probability setting unit 32 sets the vehicle-stopping probability using the traveling data for each time period.

According to the present embodiment, the traveling data storage unit 20 accumulates the traveling data of the general-use vehicle in association with weather. The probability setting unit 32 sets the vehicle-stopping probability using the traveling data associated with the weather.

The present embodiment is described above with reference to specific examples. However, the present disclosure is not limited to these specific examples. Design modifications to the above-described specific examples made as appropriate by a person skilled in the art are included in the scope of the present disclosure as long as features of the present included are included. Elements included in the above-described specific examples, as well as arrangements, conditions, shapes, and the like thereof are not limited to those given as examples and can be modified as appropriate. Combinations of elements included in the above-described specific examples can be changed as appropriate as long as technical inconsistencies do not occur.

For example, a first modification of the present embodiment may provide an energy estimation system including: a processor; a non-transitory computer-readable storage medium; a set of computer-executable instructions stored in the computer-readable storage medium that, when read and executed by the processor, cause the processor to implement: setting a vehicle speed probability that is a probability of a vehicle reaching a certain vehicle speed on a traveling route that is specified by traveling route information; estimating a vehicle speed variation pattern of the vehicle on the traveling route based on the traveling route information and the vehicle speed probability; estimating traveling load characteristics of the vehicle on the traveling route; and estimating energy required for traveling of the vehicle using the traveling load characteristics and the vehicle speed variation pattern.

A second modification of the present embodiment may provide an energy estimation method including: setting a vehicle speed probability that is a probability of a vehicle reaching a certain vehicle speed on a traveling route that is specified by traveling route information; estimating a vehicle speed variation pattern of the vehicle on the traveling route based on the traveling route information and the vehicle speed probability, estimating traveling load characteristics of the vehicle on the traveling route; and estimating energy required for traveling of the vehicle using the traveling load characteristics and the vehicle speed variation pattern.

What is claimed is:

1. An energy estimation apparatus comprising:
    a probability setting unit that sets a vehicle speed probability that is a probability of a vehicle reaching a certain vehicle speed on a traveling route that is specified by traveling route information;
    a vehicle speed pattern estimation unit that estimates a vehicle speed variation pattern of the vehicle on the traveling route based on the traveling route information and the vehicle speed probability;
    a traveling load estimation unit that estimates traveling load characteristics of the vehicle on the traveling route; and
    an energy estimation unit that estimates energy required for traveling of the vehicle using the traveling load characteristics and the vehicle speed variation pattern.

2. The energy estimation apparatus according to claim 1, wherein:
    the vehicle speed probability is a vehicle-stopping probability of the vehicle stopping at a certain location.

3. The energy estimation apparatus according to claim 1, wherein:
    the vehicle speed pattern estimation unit
        estimates the vehicle speed variation pattern when the vehicle stops at a certain location as a vehicle-stopping pattern using the vehicle speed probability, and
        estimates the vehicle speed variation pattern when the vehicle passes through a certain location as a pass-through pattern using the vehicle speed probability;
    the traveling load estimation unit estimates the traveling load characteristics of the vehicle corresponding to each of the vehicle-stopping pattern and the pass-through pattern; and
    the energy estimation unit estimates the energy required for traveling of the vehicle corresponding to each of the vehicle-stopping pattern and the pass-through pattern.

4. The energy estimation apparatus according to claim 3, wherein:
    the vehicle speed probability is a vehicle-stopping probability of the vehicle stopping at a certain location; and
    the vehicle speed pattern estimation unit
        estimates the vehicle-stopping pattern using the vehicle-stopping probability and
        calculates a pass-through probability when the vehicle passes through a certain location using the vehicle-stopping probability and estimates the pass-through pattern using the pass-through probability.

5. The energy estimation apparatus according to claim 4, wherein:
    the vehicle speed pattern estimation unit estimates the vehicle speed variation pattern using traffic information regarding the traveling route.

6. The energy estimation apparatus according to claim 4, further comprising:
    a traveling data storage unit that accumulates therein traveling data of a general-use vehicle, wherein
    the probability setting unit sets the vehicle-stopping probability using the traveling data.

7. The energy estimation apparatus according to claim 4, further comprising:
    a traveling data storage unit that accumulates therein traveling data of a general-use vehicle, wherein
    the vehicle speed pattern estimation unit estimates the vehicle speed variation pattern using the traveling data.

8. The energy estimation apparatus according to claim 4, further comprising:
    a driver selection unit that selects a driver; and
    a traveling data storage unit that accumulates therein traveling data of a general-use vehicle in association with the driver, wherein
    the vehicle speed pattern estimation unit estimates the vehicle speed variation pattern using the traveling data that is associated with the driver selected by the driver selection unit.

9. The energy estimation apparatus according to claim 4, further comprising:
    a traveling data storage unit that accumulates therein traveling data of a general-use vehicle in association a time period, wherein
    the probability setting unit sets the vehicle-stopping probability using the traveling data for each time period.

10. The energy estimation apparatus according to claim 4, further comprising:
    a traveling data storage unit that accumulates therein traveling data of a general-use vehicle in association with weather, wherein
    the probability setting unit sets the vehicle-stopping probability using the traveling data associated with the weather.

11. The energy estimation apparatus according to claim 1, wherein:
    the vehicle speed pattern estimation unit estimates the vehicle speed variation pattern using traffic information regarding the traveling route.

12. The energy estimation apparatus according to claim 1, further comprising:
    a traveling data storage unit that accumulates therein traveling data of a general-use vehicle, wherein
    the probability setting unit sets the vehicle-stopping probability using the traveling data.

13. The energy estimation apparatus according to claim 1, further comprising:
    a traveling data storage unit that accumulates therein traveling data of a general-use vehicle, wherein
    the vehicle speed pattern estimation unit estimates the vehicle speed variation pattern using the traveling data.

14. The energy estimation apparatus according to claim 1, further comprising:
    a driver selection unit that selects a driver; and
    a traveling data storage unit that accumulates therein traveling data of a general-use vehicle in association with the driver, wherein the vehicle speed pattern estimation unit estimates the vehicle speed variation pattern using the traveling data that is associated with the driver selected by the driver selection unit.

15. The energy estimation apparatus according to claim 1, further comprising:
a traveling data storage unit that accumulates therein traveling data of a general-use vehicle in association a time period, wherein
the probability setting unit sets the vehicle-stopping probability using the traveling data for each time period.

16. The energy estimation apparatus according to claim 1, further comprising:
a traveling data storage unit that accumulates therein traveling data of a general-use vehicle in association with weather, wherein
the probability setting unit sets the vehicle-stopping probability using the traveling data associated with the weather.

17. An energy estimation system comprising:
a processor;
a non-transitory computer-readable storage medium;
a set of computer-executable instructions stored in the computer-readable storage medium that, when read and executed by the processor, cause the processor to implement:
setting a vehicle speed probability that is a probability of a vehicle reaching a certain vehicle speed on a traveling route that is specified by traveling route information;
estimating a vehicle speed variation pattern of the vehicle on the traveling route based on the traveling route information and the vehicle speed probability;
estimating traveling load characteristics of the vehicle on the traveling route; and
estimating energy required for traveling of the vehicle using the traveling load characteristics and the vehicle speed variation pattern.

18. An energy estimation method comprising:
setting a vehicle speed probability that is a probability of a vehicle reaching a certain vehicle speed on a traveling route that is specified by traveling route information;
estimating a vehicle speed variation pattern of the vehicle on the traveling route based on the traveling route information and the vehicle speed probability;
estimating traveling load characteristics of the vehicle on the traveling route; and
estimating energy required for traveling of the vehicle using the traveling load characteristics and the vehicle speed variation pattern.

\* \* \* \* \*